United States Patent [19]
Rapp

[11] 3,991,459
[45] Nov. 16, 1976

[54] PALLET DISASSEMBLING APPARATUS

[76] Inventor: Kenneth K. Rapp, R.D. No. 1, Phillipsburg, N.J. 08865

[22] Filed: Dec. 10, 1975

[21] Appl. No.: 639,401

[52] U.S. Cl. ................................ 29/252; 29/244; 29/200 D
[51] Int. Cl.² ........................................ B23P 19/04
[58] Field of Search ............... 29/244, 200 D, 252, 29/251; 100/226, 227

[56] References Cited
UNITED STATES PATENTS

| | | | |
|---|---|---|---|
| 2,593,843 | 4/1952 | Cannon | 29/200 D X |
| 3,512,242 | 5/1970 | Harvis | 29/252 |
| 3,740,815 | 6/1973 | Campbell | 29/252 |
| 3,869,783 | 3/1975 | Spencer | 29/252 |

*Primary Examiner*—Al Lawrence Smith
*Assistant Examiner*—Roscoe V. Parker

[57] ABSTRACT

An apparatus for dismantling portable wooden platforms or pallets, that have become damaged during use, by removing the top and bottom deckboards from a plurality of stringers or runners. The deckboards are removed by moving the stringers between closely spaced cooperating ram members to effect the stripping of the deckboards from said stringers. The deckboards and stringers, that are salvageable, are then assembled as reconditioned platforms or pallets.

10 Claims, 6 Drawing Figures

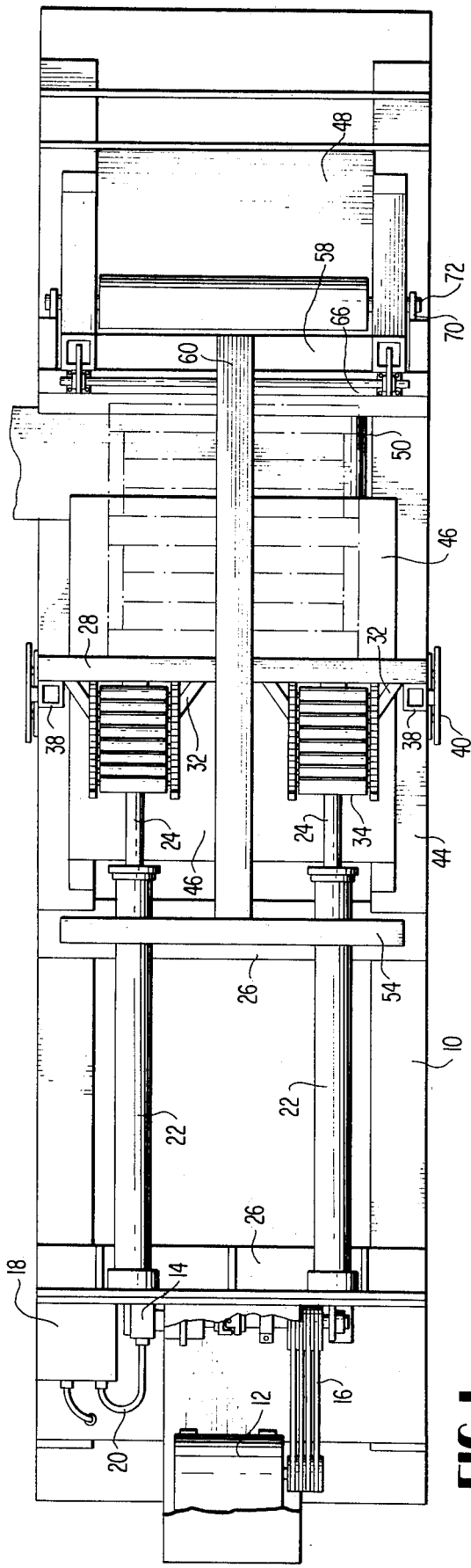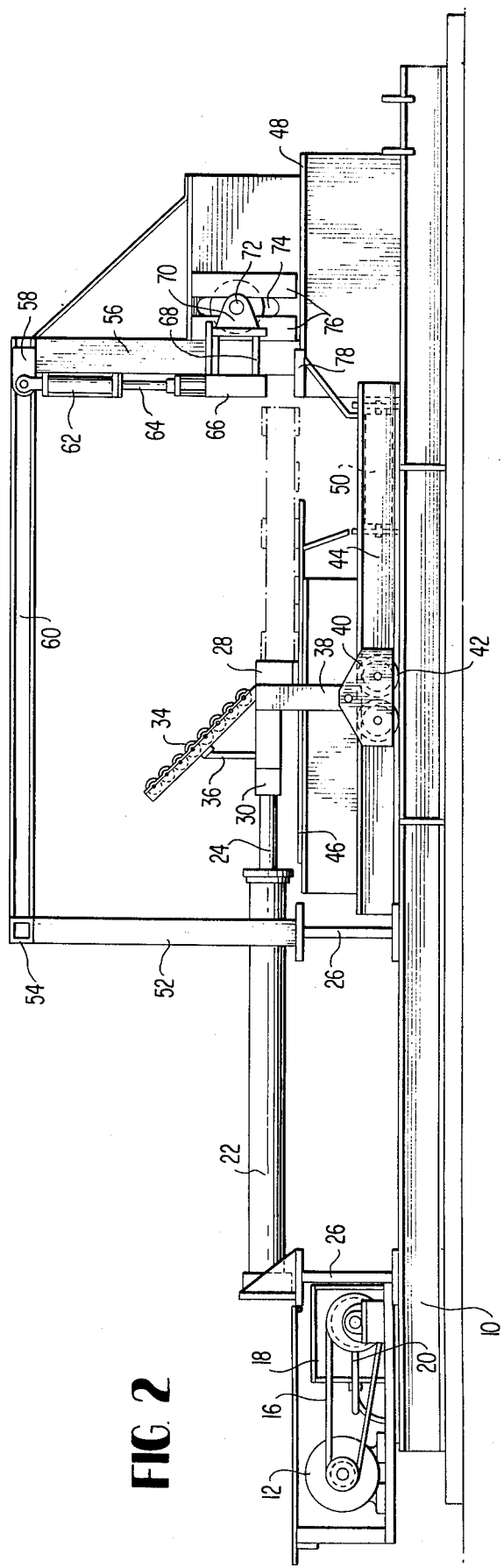

3,991,459

PALLET DISASSEMBLING APPARATUS

BACKGROUND OF THE INVENTION

The present invention relates to assembly and disassembly apparatus of the type using fluid operated pullers or pushers.

The concept of disassembling and salvaging the various components of wooden crates and pallets is not in and of itself new and novel. The patent to CANNON 2,593,843, dated Apr. 22, 1952, shows an apparatus for disassembling an empty wooden crate to facilitate its being shipped to its original source whereby it may be reassembled and used again. This patent discloses a pair of adjustable arms each of which terminate in cam-like wedges or pry heads. The wedges or pry heads are adapted to engage each slat of the crate and pry same loose so that a band saw associated with said arms can then cut the nails that secure the slats to the ends of heads of the crate. In this manner the various components of the crate may be assembled in a rather compact package or bundle. Thus a large number of crates requiring very little shipping space may be returned to their point of origin where they may be readily assembled for use again.

As concerns wooden pallets, the foregoing concept is applied to damaged pallets wherein it is highly desirable to salvage the re-useable components so that same may be used in fabricating reconditioned pallets. The patents to HARVIS 3,512,242, dated May 19, 1970, and CAMPBELL et al 3,740,815, dated June 26, 1973 are directed to a disassembling apparatus wherein a pallet is mounted upon a plurality of supporting arms that are arranged in spaced parallel relation to one another. The pallet is positioned on said arms so that the pallet stringers are parallel to the arms and the top or bottom deckboards of the pallet are supported on said arms in much the same manner that a pallet is supported on the tines of a fork lift truck. This arrangement permits vertically actuated ram members to be lowered so as to engage the stringers and force them away from the deckboards supported on said arms. Subsequent to the foregoing the pallet is then turned over so that the other deckboards are supported on said arms and they in turn are removed from the stringers by the ram members engaging said stringers and forcing them away from the deckboards.

In both the HARVIS and the CAMPBELL et al devices the pallet is first placed upon the support members and the top deck boards are removed from the stringers or runners and then secondly the pallet is repositioned upon the support members so that the bottom deckboards can then be removed from the stringers or runners. The apparatus of the present invention constitutes an improvement over the aforementioned patents in that the removal of the deckboards from the stringers or runners is carried out in a single operation.

SUMMARY OF THE INVENTION

The present invention is directed to an apparatus for disassembling a wooden pallet. It is particularly adaptable to damaged pallets wherein it is highly desirable to salvage reuseable components that may be utilized in fabricating reconditioned pallets.

The complete dismantling of a wooden pallet or the repair of a damaged one is usually a time consuming operation as practically all of the work is manual so that such an operation usually results in an economic loss. The apparatus of the present invention is readily capable of removing all of the deckboards, both top and bottom, from the several stringers or runners in a single operation. This is carried out by a machine, under the control of a single operator with the top and bottom deckboards after their removal from the stringers or runners being conveyed to a desired area as a source of supply for the fabricating of reconditioned pallets. In lieu of removing all of the deckboards, the apparatus of the present invention may be adjusted so that only the deckboards on one side of the stringers or runners will be removed.

BRIEF DESCRIPTION OF THE DRAWING

FIG. 1 is a top plan view of a pallet disassembling apparatus embodying the present invention;

FIG. 2 is a side elevational view of the pallet disassembling apparatus of FIG. 1;

DESCRIPTION OF THE PREFERRED EMBODIMENT

Figure 3:
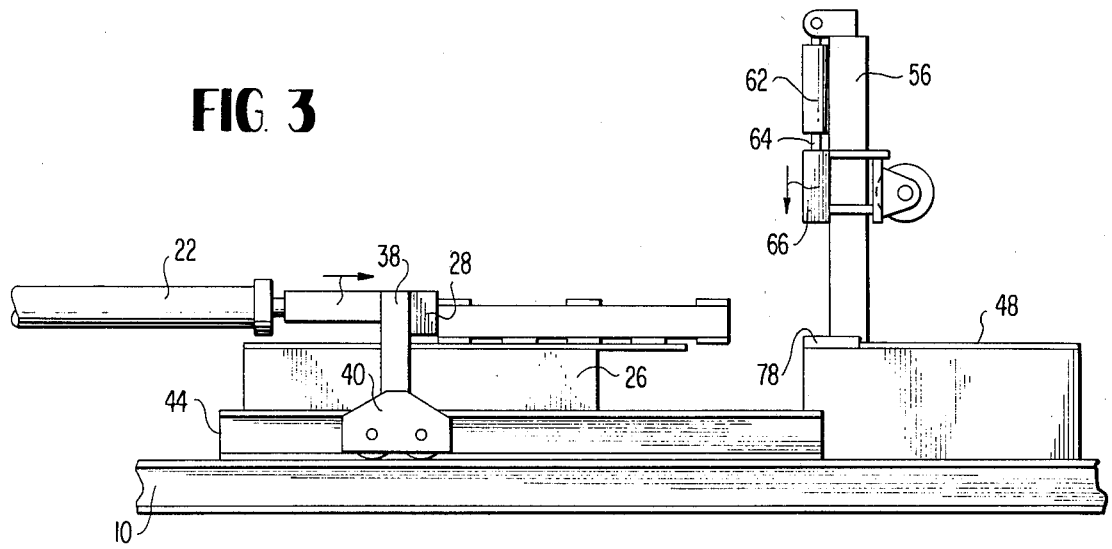
FIG. 3 is a side elevational view of a fragmentary portion of the apparatus of FIG. 1 showing the apparatus as it initially engages a pallet.

Referring to FIGS. 1 and 2 there is shown an elongated rectangular shaped base member 10 which has supported on one end thereof a conventional electric motor 12 for driving a fluid pump 14 by means of a belt drive 16. The pump 14 is connected to a fluid reservoir 18 by suitable conduits 20 so that fluid under pressure may be delivered to hydraulic cylinders 22. The cylinders 22 are provided with the usual pistons and piston rods 24 and said cylinders have conventional conduits or hose lines connected to the respective ends to effect the reciprocation of the pistons within the cylinders under the action of the pump 14. The forward and rearward ends of the cylinders 22 are supported upon transverse beam members 26 that are mounted upon the base member 10.

The forward end of the piston rods 24 are connected to a ram assembly which includes a member or ram 28 that extends transversely of the base member 10 and has projecting from the rear face thereof a pair of tubular socket members 30 for receiving the forward ends of the piston rods 24. The tubular socket members 30 and the ram or member 28 are provided with suitable bracing elements 32 while a pair of gravity feed roller units 34 are connected to said ram or member 28 and arranged to overlie said tubular socket members 30. The gravity feed roller units 34 are arranged in a rearwardly inclined position with respect to said ram 28 and are maintained in said position by suitable bracing members 36 interposed between said roller units and said tubular socket members 30. The ends of the transverse ram or member 28 are secured to the upper ends of vertical post or support members 38 with the lower ends of said post being connected to carriage structures 40 that are provided with rollers 42 for movement along suitable track ways 44 mounted upon the base member 10.

There is mounted upon the central portion of the base member 10 a table or support 46 that is positioned ahead of the foremost beam member 26 and beneath the forward end of the cylinders 22 and the transverse ram structure 28. The table or support 46 is positioned intermediate the posts 38 but terminates at a point spaced from the ends of the track way 44 so that the ram 28 is capable of moving over and beyond the top surface of the table under the action of the piston rods 24, carriage 40 and rollers 42. A second table 48 is mounted upon the base member 10 at the end of the track ways 44 and in spaced relation to the first table or support 46 with the upper surfaces of the two tables lying in substantially the same horizontal plane. There is mounted on the base member 10 in the space or area between the two tables or supports 46 and 48 a conventional endless conveyor consisting of the usual rollers and belt 50 for conveying transversely of the base member 10 any objects that might be received from either table or support 46 or 48.

The transverse beam 26 located adjacent the forward end of the cylinders 22 has mounted on each end thereof a vertical support 52 which supports are connected at their upper ends by a beam member 54. A similar structure is mounted upon the innermost end of the table or support 48 and consists of vertical supports 56 that are connected at their upper ends by a transverse beam member 58. The beam members 54 and 58 are connected to one another in the central portion thereof by an "I" beam 60 which has mounted on the end portion overlying the table or support 48, a depending hydraulic cylinder 62 which is connected to a fluid source of supply by suitable conduits, not shown. The cylinder 62 has a piston rod 64 that is connected to an adjustable stop ram 66 which is slidably carried by the vertical supports 56. The ram 66 is provided with suitable clamp elements 68 that slidably embrace the vertical supports and which clamps have projecting segments 70 to which are secured an elongated rod 72. The table 48 is provided with suitable guideways 74 in vertically extending support members 76 to facilitate the vertical movement of the stop ram 66 under the action of the piston 64 and the cylinder 62. The table 48 has mounted on the upper surface thereof along the edge adjacent the conveyor 50, a fixed ram plate 78 that is positioned within the vertical path of movement of the adjustable stop ram 66.

Figure 4:
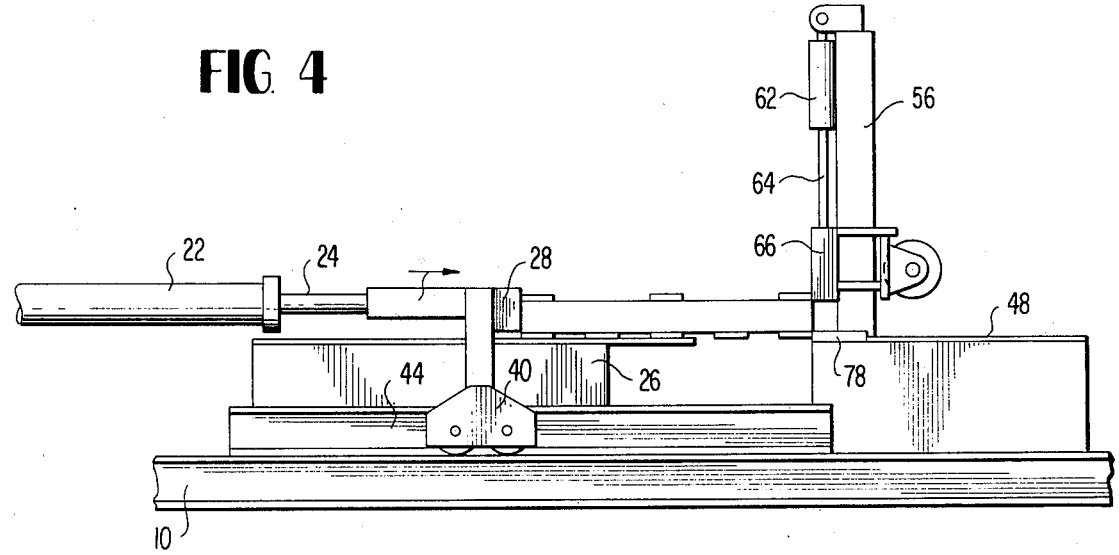
FIGS. 4, 5 and 6 are views similar to FIG. 3 showing the pallet in various stages of being disassembled by the apparatus of the present invention.

In the use or operation of the pallet disassembling apparatus, fluid is delivered to the cylinders 22 by the pump 14 to cause the piston rods 24 to be retracted into said cylinders and thus move the ram or member 28 and its associated carriage 40 over the surface of table or support 46 in the direction of the beam members 26. With the forward end of the table or support 46 being clear of the ram or member 28 a pallet, that is to be disassembled is positioned thereon with the pallet stringers or runners arranged so as to be parallel to the path of movement of the pistons 24 and wherein the ram or member 28 will engage a butt end of said stringers. The pallet is positioned on the table 46 so that the deckboards are at right angles to the feed direction of the ram or member 28 with the top deckboards in engagement with the surface of the table in the manner as illustrated in FIG. 3. The ram or member 28 is then moved over the surface of the table 46 under the fluidic action of the cylinders 22 and pistons 24 so as to engage the stringers of the pallet and move same over the surface of the table 46 towards table 48. As the pallet is moved towards the table 48, fluid is delivered to the cylinder 62 for moving the piston rod 64 and stop ram 66 downwardly to a position wherein the bottom surface of the ram 66 will be slightly spaced from the top surface of the pallet stringers. The fixed ram plate 78 mounted on the table 48 is positioned so that the lower surface of the pallet stringers will have a sliding engagement therewith. This arrangement will permit the pallet stringers to slide beneath the ram 66 and over the upper surface of the ram plate 78 as shown in FIG. 4.

Figure 5:
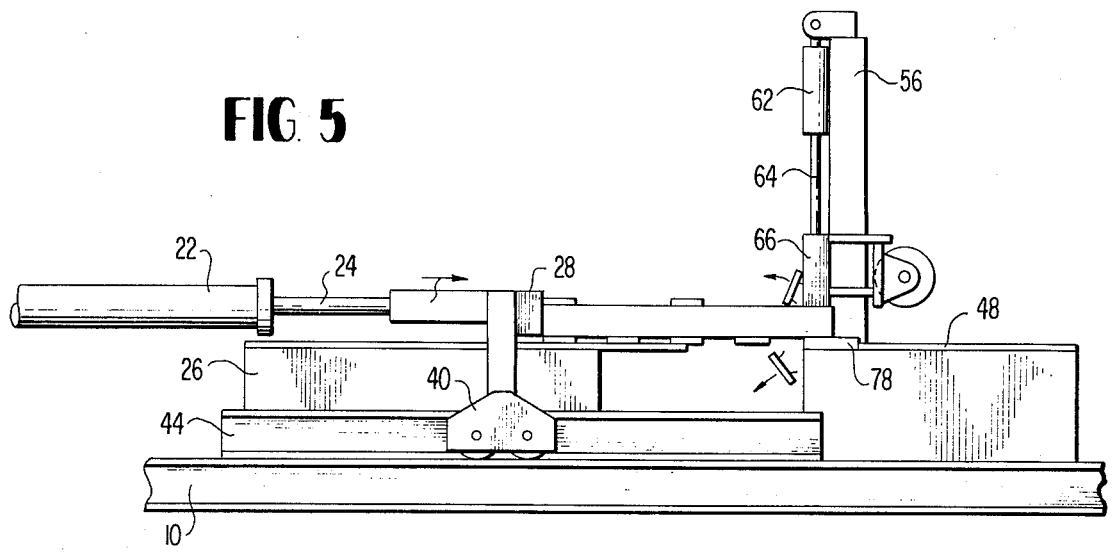
Figure 6:
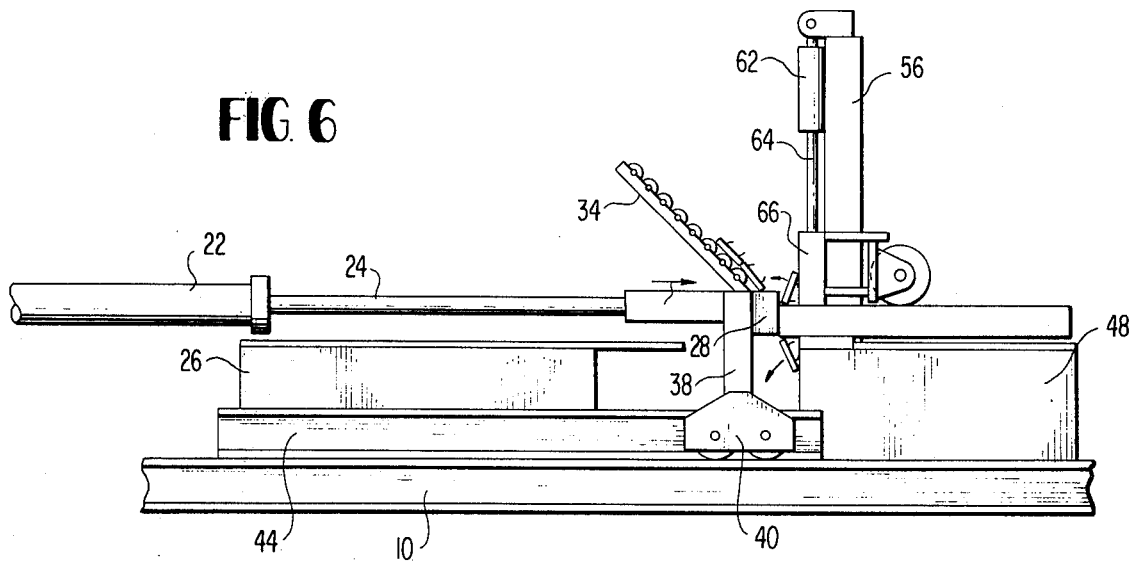

As the ram or member 28 is moved forward the stringers or runners of the pallet move under the stop ram 66 and over the fixed ram plate 78 so that the bottom and top deckboards engage the stop ram 66 and ram plate 78 respectively and are stripped from the stringers. The continued movement of the pallet by the ram member 28 will move the stringers onto the table 48 and cause the top deckboards to drop down onto the conveyor belt 50 where they will be moved to one side of the machine as shown in FIG. 5. The bottom deckboards upon being removed from the stringers will be forced up the feed roll units 34, see FIG. 6, and these boards will fall from the units 34 onto the conveyor belt 50 upon the retraction of the ram or member 28 by the piston rods 24 being drawn into the cylinders 22. The movement of the ram or member 28 towards and away from the table 48 is enhanced by the carriage 40 and rollers 42 moving along the trackways 44.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. Pallet disassembling apparatus comprising a frame, an elongated support mounted on said frame and providing a relatively flat horizontal surface for receiving a pallet consisting of a plurality of spaced parallel stringers connected by a plurality of top and bottom deck boards arranged transversely of said stringers, a reciprocatory ram mounted on said frame for engaging said stringers and moving said pallet over said surface, said surface having a fixed plate member secured thereto, a vertically adjustable stop ram carried by said frame and overlying a said fixed plate member, said stop ram being positioned in fixed relationship with respect to said fixed plate member to permit the passage therebetween of the stringers of said pallet upon the movement of said ram over said surface, said stop ram and fixed plate member engaging the deck boards of said pallet to effect their removal from said stringers.

2. A pallet disassembling apparatus as set forth in claim 1 wherein said surface is formed with an opening extending transversely of the longitudinal axis of said surface, an endless conveyor positioned in said opening for receiving the deckboards removed from said stringers by said stop ram and fixed plate.

3. A pallet disassembling apparatus as set forth in claim 1 wherein said surface comprises a first and second table positioned on said frame and spaced from one another to permit an endless conveyor to be mounted therebetween on said frame.

4. A pallet disassembling apparatus as set forth in claim 3 wherein said reciprocatory ram is provided with a plurality of roller units for receiving the deckboards removed from said stringers by said stop ram.

5. A pallet disassembling apparatus as set forth in claim 1 wherein said reciprocatory ram extends transversely of said surface with the ends of the reciprocatory ram connected to supports having carriage members with rollers for movement on trackways mounted on said frame.

6. A pallet disassembling apparatus as set forth in claim 1 wherein said stop ram is carried by a piston and cylinder structure that is dependingly mounted upon a beam member supported by said frame.

7. A pallet disassembling apparatus as set forth in claim 1 wherein said reciprocatory ram is connected to a plurality of piston rods having cylinders supported on said frame.

8. A pallet disassembling apparatus as set forth in claim 3 wherein said fixed plate member is mounted on said second table adjacent the edge contiguous said conveyor assembly.

9. A pallet disassembling apparatus as set forth in claim 8 wherein said stop ram is carried by segments moving in guideways provided on said second table.

10. A pallet disassembling apparatus as set forth in claim 4 wherein a motor and fluid pump are mounted on said frame and connected to cylinder and piston structures for moving said reciprocatory ram over the surface of said first table to push said stringers between said stop ram and fixed plate and onto said second table contemporaneous with the stripping of said deckboards from said stringers and the delivery of certain of the deckboards to said conveyor and the other deckboards to said roller units where they are delivered to said conveyor upon the retraction of said reciprocatory ram over the surface of the first table.

* * * * *